(12) United States Patent
Sakashita

(10) Patent No.: US 11,820,358 B2
(45) Date of Patent: Nov. 21, 2023

(54) CHARGING/DISCHARGING CONTROL DEVICE

(71) Applicant: HINO MOTORS, LTD., Hino (JP)

(72) Inventor: Hiroki Sakashita, Hino (JP)

(73) Assignee: HINO MOTORS, LTD., Hino (JP)

( * ) Notice: Subject to any disclaimer, the term of this patent is extended or adjusted under 35 U.S.C. 154(b) by 688 days.

(21) Appl. No.: 16/962,021

(22) PCT Filed: Jul. 11, 2019

(86) PCT No.: PCT/JP2019/027426
§ 371 (c)(1),
(2) Date: Jul. 14, 2020

(87) PCT Pub. No.: WO2020/013253
PCT Pub. Date: Jan. 16, 2020

(65) Prior Publication Data
US 2020/0346633 A1    Nov. 5, 2020

(30) Foreign Application Priority Data

Jul. 13, 2018    (JP) .................................. 2018-133015

(51) Int. Cl.
*B60L 15/20*    (2006.01)
*B60K 6/42*    (2007.10)
(Continued)

(52) U.S. Cl.
CPC ............... *B60W 20/13* (2016.01); *B60K 6/42* (2013.01); *B60L 15/20* (2013.01); *B60L 50/16* (2019.02);
(Continued)

(58) Field of Classification Search
None
See application file for complete search history.

(56) References Cited

U.S. PATENT DOCUMENTS

| 10,821,839 B1* | 11/2020 | Wright | .................... B60L 50/62 |
| 2011/0276209 A1* | 11/2011 | Suganuma | ............ B60W 10/26 |
| | | | 180/65.265 |
| 2017/0144650 A1* | 5/2017 | Nagamiya | ................ B60K 6/22 |

FOREIGN PATENT DOCUMENTS

| EP | 2692604 A1 | 3/2014 |
| JP | 2001-169408 A | 6/2001 |

(Continued)

OTHER PUBLICATIONS

European Application No. EP 19833595 received a Supplemental Europeans Search Repot dated Jun. 22, 2021, 7 pages.
(Continued)

*Primary Examiner* — Todd Melton
*Assistant Examiner* — Jason R Roberson
(74) *Attorney, Agent, or Firm* — KILPATRICK TOWNSEND & STOCKTON LLP

(57) ABSTRACT

A charging/discharging control device includes a route information acquisition unit, a section identification unit that identifies an excessive discharging section and an excessive charging section, and a charging/discharging control unit that controls charging and discharging of a battery. The charging/discharging control unit limits a charge current value in the excessive charging section to a fixed first upper limit value. The state of charge reaches a maximum state of charge at an end point of the excessive charging section when the charge current value is maintained at the first upper limit value. The charging/discharging control unit limits a discharge current value in the excessive discharging section to a fixed second upper limit value. The state of charge reaches a minimum state of charge at an end point of the excessive discharging section when the discharge current value is maintained at the second upper limit value.

4 Claims, 5 Drawing Sheets

(51) Int. Cl.
- *B60L 50/16* (2019.01)
- *B60W 10/08* (2006.01)
- *B60W 10/26* (2006.01)
- *B60W 20/12* (2016.01)
- *B60W 20/13* (2016.01)
- *H01M 10/44* (2006.01)
- *H01M 10/48* (2006.01)
- *H02J 7/00* (2006.01)

(52) U.S. Cl.
CPC ............ *B60W 10/08* (2013.01); *B60W 10/26* (2013.01); *B60W 20/12* (2016.01); *H01M 10/44* (2013.01); *H01M 10/486* (2013.01); *H02J 7/007* (2013.01)

(56) References Cited

FOREIGN PATENT DOCUMENTS

| | | |
|---|---|---|
| JP | 2012-130213 A | 7/2012 |
| JP | 2014111413 A | 6/2014 |
| JP | 2015-033154 A | 2/2015 |
| JP | 2015-155261 A | 8/2015 |
| JP | 2018001768 A | 2/2020 |
| WO | 2020-013253 A1 | 1/2020 |

OTHER PUBLICATIONS

International Search Report and Written Opinion mailed in International Patent Application No. PCT/JP2019/027426, filed Jan. 16, 2020, 8 pages.

\* cited by examiner

Fig.3A
| Current Position Information | | |
|---|---|---|
| Current Position | Altitude | Classification |
| P0 | H0 | Highway |
Fig.3B
| Section Information | | | | |
|---|---|---|---|---|
| End Position | Altitude | Section Length | Gradient Value | Classification |
| P1 | H1 | L1 | θ1 | Highway |
| P2 | H2 | L2 | θ2 | Highway |
| ⋮ | ⋮ | ⋮ | ⋮ | ⋮ |
| Pk-1 | Hk-1 | Lk-1 | θk-1 | Highway |
| Pk | Hk | Lk | θk | Highway |
Fig.4
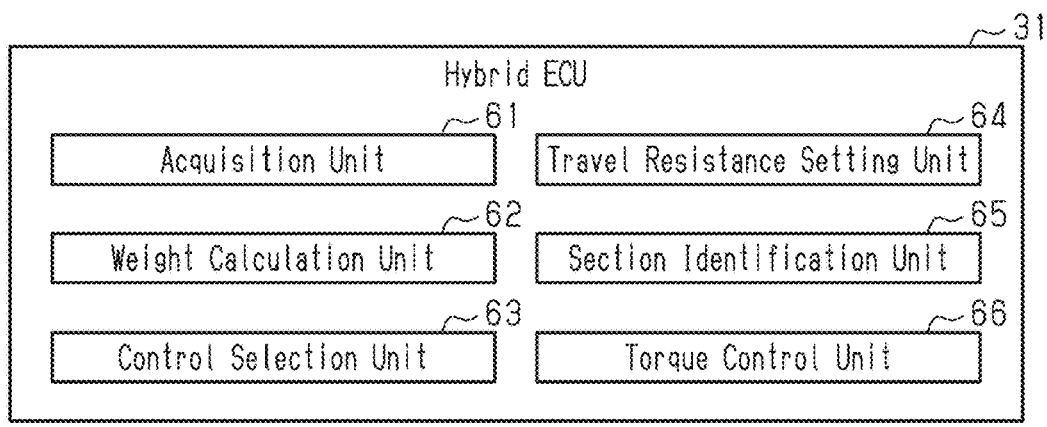
Fig.5A
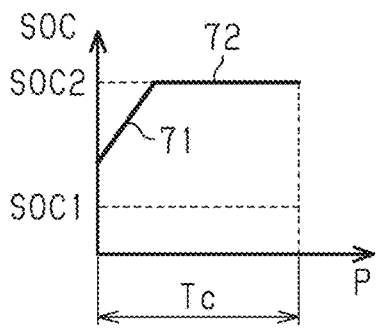
Fig.5B
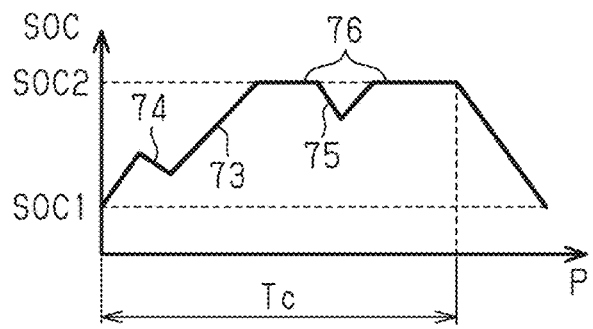

CHARGING/DISCHARGING CONTROL DEVICE

TECHNICAL FIELD

The present disclosure relates to a charging/discharging control device.

BACKGROUND ART

A known hybrid automobile includes an engine and a motor generator, which are drive sources. In the hybrid automobile, fuel economy can be improved by driving the motor generator as a motor and assisting the engine when the engine combustion efficiency is low (for example, when the automobile is started). In the battery that supplies such a motor generator with power, thermal degradation tends to progress easily as the battery temperature (the temperature of the battery) becomes excessively high. Thus, Patent Document 1 discloses an example of a technique of curbing an excessive rise in the battery temperature by limiting the output of the motor generator, i.e., by limiting charging/discharging of the battery, when the battery temperature is greater than or equal to a predetermined limit temperature.

PRIOR ART DOCUMENTS

Patent Documents

Patent Document 1: Japanese Laid-Open Patent Publication No. 2015-33154

SUMMARY OF THE INVENTION

Problems that the Invention is to Solve

The method described in Patent Document 1 is capable of curbing an excessive rise in the battery temperature. However, ensuring the charge/discharge amount of the battery becomes difficult when charging/discharging is limited due to the battery temperature. This may worsen the fuel economy.

It is an objective of the present disclosure to provide a charging/discharging control device capable of ensuring the charge/discharge amount of a battery while curbing a rise in the battery temperature.

Means for Solving the Problem

An aspect of the present disclosure provides a charging/discharging control device configured to control charging and discharging of a battery installed in a hybrid vehicle that includes a motor generator. The motor generator is a power source. The charging/discharging control device includes a route information acquisition unit configured to acquire a planned travel route, a start point of the planned travel route being a current position, a section identification unit configured to estimate a change in a state of charge of the battery using a change in potential energy on the planned travel route and identify an excessive discharging section and an excessive charging section on the planned travel route, and a charging/discharging control unit configured to control charging and discharging of the battery by controlling an output of the motor generator. The excessive charging section includes a section where the state of charge continues to rise to a maximum state of charge and is then maintained at the maximum state of charge. The excessive discharging section includes a section where the state of charge continues to fall to a minimum state of charge and is then maintained at the minimum state of charge. The charging/discharging control unit is configured to limit a charge current value in the excessive charging section to a fixed first upper limit value. The first upper limit value is set such that the state of charge reaches the maximum state of charge at an end point of the excessive charging section when the charge current value in the excessive charging section is maintained at the first upper limit value. The charging/discharging control unit is further configured to limit a discharge current value in the excessive discharging section to a fixed second upper limit value, wherein the second upper limit value is set such that the state of charge reaches the minimum state of charge at an end point of the excessive discharging section when the discharge current value in the excessive discharging section is maintained at the second upper limit value.

BRIEF DESCRIPTION OF THE DRAWINGS

FIG. 3A is a table schematically showing current position information in an example of route information.

FIG. 3B is a table schematically showing section information in an example of route information.

FIG. 4 is a functional block diagram showing an example of the hybrid ECU.

FIG. 5A is a graph showing an example of an excessive charging section.

FIG. 5B is a graph showing another example of an excessive charging section.

MODES FOR CARRYING OUT THE INVENTION

A charging/discharging control device according to an embodiment will now be described with reference to FIGS. 1 to 9.

Figure 1:
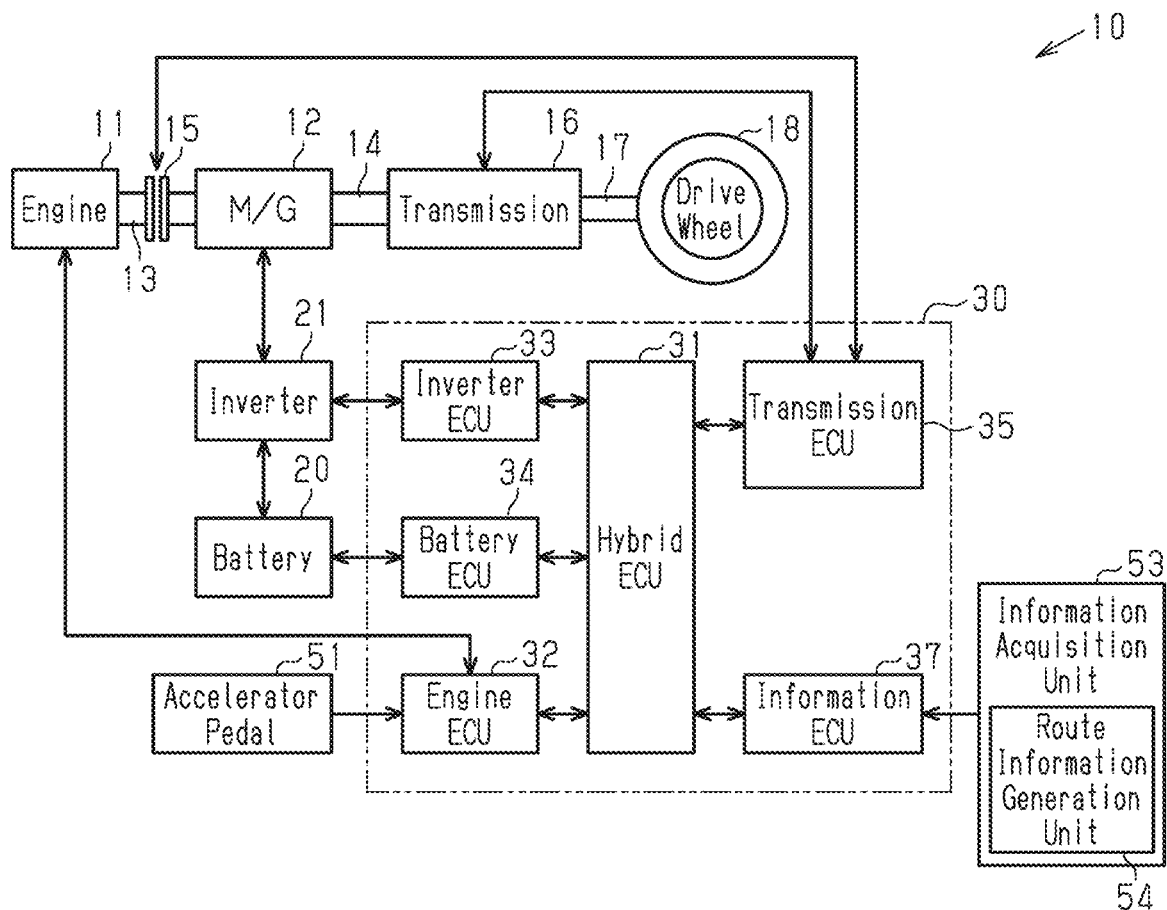
FIG. 1 is a functional block diagram schematically showing the overall configuration of a hybrid automobile equipped with a charging/discharging control device according to an embodiment.

As shown in FIG. 1, a vehicle 10, which is a hybrid automobile, includes an engine 11 and a motor generator 12 (hereinafter referred to as M/G 12), which are power sources. A rotary shaft 13 of the engine 11 and a rotary shaft 14 of the M/G 12 are connected to each other such that they can be disconnected by a clutch 15. The rotary shaft 14 of the M/G 12 is connected to drive wheels 18 via, for example, a transmission 16 and a drive shaft 17.

The engine 11 is, for example, a diesel engine with multiple cylinders. When fuel burns in each cylinder, torque is generated to rotate the rotary shaft 13. When the clutch 15 is connected, the torque generated by the engine 11 is transmitted to the drive wheels 18 via the rotary shaft 14 of the M/G 12, the transmission 16, and the drive shaft 17.

The M/G 12 is electrically connected to a battery 20 via an inverter 21. The battery 20 is a rechargeable battery capable of being charged and discharged. The battery 20 includes multiple cells that are electrically connected to one another. When supplied with the power stored in the battery 20 via the inverter 21, the M/G 12 functions as a motor that assists the engine 11 by rotating the rotary shaft 14. When the M/G 12 functions as a motor, the M/G 12 generates a motor torque Tm. The motor torque Tm is transmitted to the drive wheels 18 through the transmission 16 and the drive shaft 17. Further, the M/G 12 functions as a generator that stores, in the battery 20 via the inverter 21, the power generated using the rotation of the rotary shaft 14 when, for example, the accelerator is off. The braking torque generated when the M/G 12 functions as a generator is a regenerative torque Tr.

The transmission 16 changes the torque of the rotary shaft 14 of the M/G 12 and transmits the new torque to the drive wheels 18 through the drive shaft 17. The transmission 16 is capable of setting multiple gear ratios Rt.

When the M/G 12 functions as a motor, the inverter 21 converts the direct-current voltage from the battery 20 into alternating-current voltage to supply the M/G 12 with power. When the M/G 12 functions as a generator, the inverter 21 converts the alternating-current voltage from the M/G 12 into direct-current voltage to supply the battery 20 with power and charge the battery 20.

The vehicle 10 includes a high-voltage circuit having the M/G 12, the inverter 21, and the battery 20, which are high-voltage components. In the following description, the current flowing into the battery 20 when power is supplied from the inverter 21 to the M/G 12 is referred to as the discharge current, and the current flowing into the battery 20 when power is supplied from the inverter 21 to the battery 20 is referred to as the charge current.

The above-described engine 11, clutch 15, inverter 21, transmission 16, and the like are controlled by a control device 30. The control device 30 controls the vehicle 10 in an integrated manner.

The control device 30 includes, for example, a hybrid ECU 31, an engine ECU 32, an inverter ECU 33, a battery ECU 34, a transmission ECU 35, and an information ECU 37. The ECUs 31, 32, 33, 34, 35, and 37 are connected to one another by, for example, a control area network (CAN).

The electronic control units (ECUs) 31, 32, 33, 34, 35, and 37 mainly include a microcomputer in which a processor, a memory, an input interface, an output interface, and the like are connected to one another by a bus. The ECUs 31, 32, 33, 34, 35, and 37 acquire state information, which relates to the state of the vehicle 10, via the input interface and executes various processes using the acquired state information and using a control program and various types of data stored in the memory.

The hybrid ECU 31 acquires, through the input interface, various types of the state information output by the ECUs 32, 33, 34, 35, and 37. For example, the hybrid ECU 31 uses a signal from the engine ECU 32 to acquire a requested torque Tdry from the driver and an engine rotation speed Ne, which is the rotation speed of the rotary shaft 13 of the engine 11. The hybrid ECU 31 uses a signal from the inverter ECU 33 to acquire a motor rotation speed Nm, which is the rotation speed of the rotary shaft 14 of the M/G 12. The hybrid ECU 31 uses a signal from the battery ECU 34 to acquire a battery voltage and a state of charge SOC of the battery 20. The hybrid ECU 31 uses a signal from the transmission ECU 35 to acquire, for example, disconnection state information of the clutch 15 and the gear ratio Rt in the transmission 16. The hybrid ECU 31 uses a signal from the information ECU 37 to acquire, for example, a vehicle speed v and route information.

The hybrid ECU 31 uses the acquired information to generate various control signals and output the generated control signals to the ECUs 32, 33, 34, 35, and 37 via the output interface. The hybrid ECU 31 calculates an engine command torque Teref, which is a command torque to the engine 11, and outputs to the engine ECU 32 a control signal indicating the calculated engine command torque Teref. The hybrid ECU 31 calculates a motor command torque Tmref, which is a command torque to the M/G 12, and outputs to the inverter ECU 33 a control signal indicating the calculated motor command torque Tmref. The hybrid ECU 31 outputs to the transmission ECU 35 a control signal commanding the disconnection of the clutch 15 and a control signal commanding the gear ratio Rt in the transmission 16.

The engine ECU 32 acquires the engine rotation speed Ne and an accelerator operation amount ACC of an accelerator pedal 51, and controls, for example, a fuel injection amount and an injection timing such that the torque corresponding to an amount of the engine command torque Teref that has been input from the hybrid ECU 31 acts on the rotary shaft 13. The engine ECU 32 uses, for example, the accelerator operation amount ACC and the engine rotation speed Ne to calculate the requested torque Tdry from the driver and output the calculated requested torque Tdry to the hybrid ECU 31.

The inverter ECU 33 acquires the motor rotation speed Nm, and controls the inverter 21 such that the torque corresponding to an amount of the motor command torque Tmref that has been input from the hybrid ECU 31 acts on the rotary shaft 14.

The battery ECU 34 monitors a charge/discharge current I of the battery 20 and calculates the state of charge SOC of the battery 20 using an integration value of the charge/discharge current I. In addition to the charge/discharge current I of the battery 20, the battery ECU 34 acquires the battery voltage.

The transmission ECU 35 controls the disconnection of the clutch 15 in response to a request of disconnecting the clutch 15 from the hybrid ECU 31. Further, the transmission ECU 35 controls the gear ratio Rt of the transmission 16 using a control signal that indicates the gear ratio Rt from the hybrid ECU 31.

The information ECU 37 acquires various types of information using signals from various sensors, which are the components of an information acquisition unit 53, and outputs the acquired information to the hybrid ECU 31. For example, the information ECU 37 acquires the vehicle speed v of the vehicle 10 that is based on a signal from a vehicle speed sensor and outputs the acquired vehicle speed v to the hybrid ECU 31.

In addition, the information ECU 37 acquires the route information, which includes current position information and section information. The current position information indicates the current position of the vehicle 10. The section information relates to the sections of a planned travel route where the vehicle 10 is planned to travel from the current position. The planned travel route is acquired in a range of, for example, several km to several tens of km.

The information acquisition unit 53 includes a route information generator 54, which is, for example, a locator device or a car navigation device, as a device related to the route information. Such a locator device or car navigation device includes road position information, altitude information, and map information. In the road position information, the coordinates of each position in the road are defined. In the altitude information, the altitude of each position is defined. The map information is related to, for example, classification information in which the classification of a road such as a highway is defined for each position in the road.

The locator device acquires the current position information, which indicates the current position of the vehicle 10 through a satellite positioning system. The locator device sets the planned travel route using the current position information and the map information to generate the section information related to the set planned travel route.

The car navigation device acquires the current position information, which indicates the current position of the vehicle 10 through the satellite positioning system. The car navigation device sets, as a planned travel route, for example, the route to a destination that has been set by the driver and generates the section information related to the planned travel route.

Figure 2:
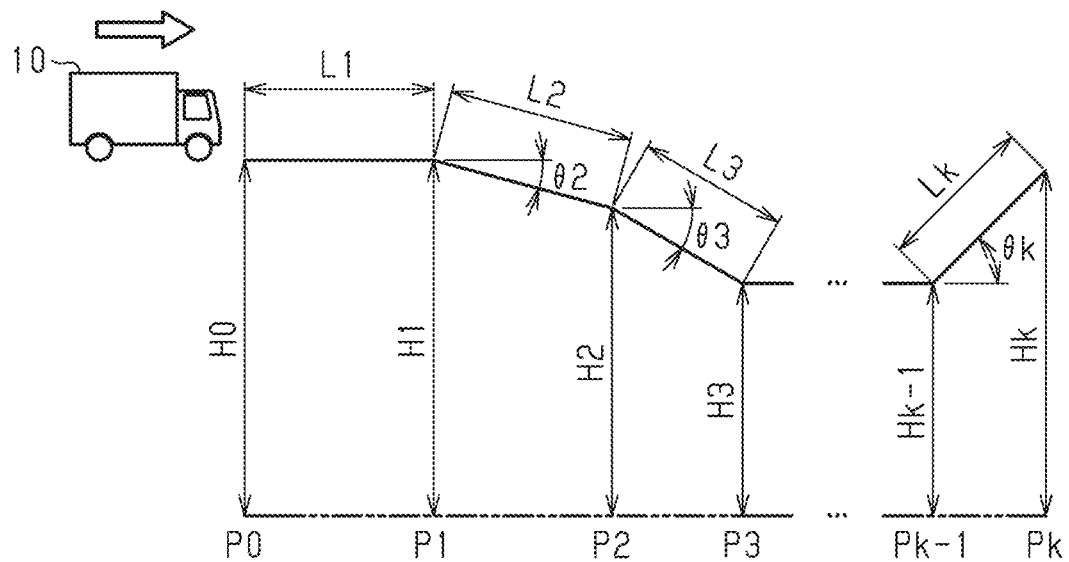
FIG. 2 is a diagram schematically showing an example of a planned travel route.

As shown in FIG. 2, when the planned travel route is set, the route information includes the current position information, which is shown in FIG. 3A, and the section information, which is shown in FIG. 3B.

As shown in FIG. 3A, the current position information includes a current position P0, an altitude H0 of the current position P0, and its classification. The section that connects nodes is referred to as the unit section. As shown in FIG. 3B, the section information includes, for example, an end position Pk of the unit section, an altitude Hk, a section length Lk, a gradient value θk (k is an integer greater than or equal to 1), and classification.

The hybrid ECU 31 uses various types of information that has been input from the information ECU 37 to execute a high-speed traveling charge/discharge control. The high-speed traveling charge/discharge control is a charge/discharge control of the battery 20 performed when the vehicle 10 is traveling on a highway at a high speed.

The hybrid ECU 31 includes various functional units that function when various programs related to the high-speed traveling charge/discharge control are executed. That is, the hybrid ECU 31 includes an acquisition unit 61, a weight calculation unit 62, a control selection unit 63, a travel resistance setting unit 64, a section identification unit 65, and a torque control unit 66.

The acquisition unit 61 corresponds to a route information acquisition unit. The acquisition unit 61 acquires the vehicle speed v in addition to the route information that has been output by the information ECU 37. Further, the acquisition unit 61 acquires the accelerator operation amount ACC, the engine rotation speed Ne, and the gear ratio Rt in the transmission 16.

The weight calculation unit 62 calculates a weight W of the vehicle 10. The weight calculation unit 62 calculates the weight W of the vehicle 10 using, for example, the accelerator operation amount ACC, the engine rotation speed Ne, the vehicle speed v, and the gear ratio Rt in the transmission 16.

The control selection unit 63 uses various types of information acquired by the acquisition unit 61 to select a control mode of outputting the M/G 12. In a case where the vehicle 10 is traveling at a high speed on a highway (for example, the vehicle speed is greater than or equal to 60 km/h), the control selection unit 63 uses the route information and the vehicle speed v to select a temperature rise curbing control. In other cases, the control selection unit 63 selects a normal control.

The travel resistance setting unit 64 sets a travel resistance for each unit section in the section information. The travel resistance setting unit 64 sets the travel resistance for each section by taking into account the air resistance corresponding to the shape of a vehicle relative to, for example, a gradient resistance that is based on the gradient value θk of each section and a rolling resistance that is based on the classification of a road.

The section identification unit 65 estimates the changes in the state of charge SOC in the planned travel route and identifies an excessive discharging section Td and an excessive charging section Tc.

The section identification unit 65 estimates the changes in the state of charge SOC by hypothesizing that the vehicle 10 having the weight W does high-speed traveling on the planned travel route at a fixed vehicle speed v. The section identification unit 65 estimates the changes in the state of charge SOC of the battery 20 on the planned travel route by taking into account, relative to a change in potential energy based on the weight W and the altitude differences between sections, a resistance loss based on the vehicle speed v, a resistance loss based on the travel resistance, a resistance loss based on a section length, conversion efficiencies of the M/G 12 and the inverter 21, and the like. Further, the section identification unit 65 uses the changes in the state of charge SOC to set the excessive charging section Tc and the excessive discharging section Td in the planned travel route.

The excessive charging section Tc includes a rising section where the state of charge SOC rises from a minimum state of charge SOC1 to a maximum state of charge SOC2 and a maximum maintenance section where the state of charge SOC is maintained at the maximum state of charge SOC2. For example, as shown in FIG. 5A, the excessive charging section Tc includes a continuously rising continuously rising section 71 and a maximum maintenance section 72, which follows the continuously rising section 71. In the continuously rising section 71, the state of charge SOC continues to rise to the maximum state of charge SOC2. In the maximum maintenance section 72, the state of charge SOC is maintained at the maximum state of charge SOC2. Further, for example, as shown in FIG. 5B, the excessive charging section Tc includes a temporal discharging section 74 during a rising section 73. In the temporal discharging section 74, the state of charge SOC never reaches the minimum state of charge SOC1. The excessive charging section Tc also includes a temporal discharging section 75 in a maximum maintenance section 76. In the temporal discharging section 75, the state of charge SOC never reaches the minimum state of charge SOC1.

Figure 6A:
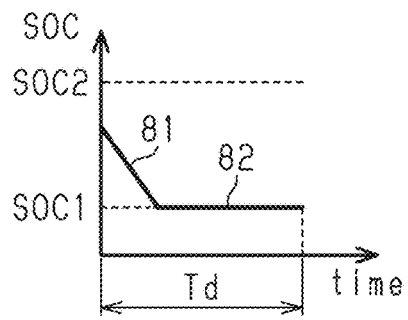
FIG. 6A is a graph showing an example of an excessive discharging section.
Figure 6B:
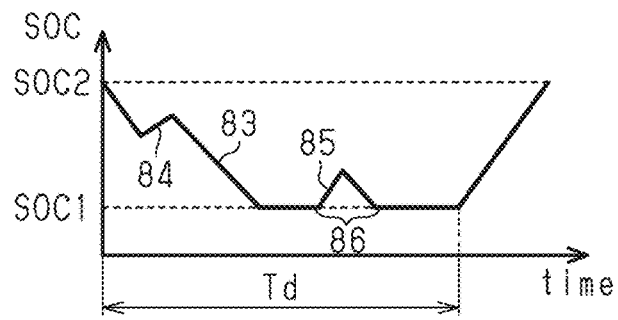
FIG. 6B is a graph showing another example of an excessive discharging section.

The excessive discharging section Td includes a falling section where the state of charge SOC falls from the maximum state of charge SOC2 to the minimum state of charge SOC1 and a minimum maintenance section where the state of charge SOC is maintained at the minimum state of charge SOC1. For example, as shown in FIG. 6A, the excessive discharging section Td includes a continuously falling section 81 and a minimum maintenance section 82, which follows the continuously falling section 81. In the continuously falling section 81, the state of charge SOC continues to fall to the minimum state of charge SOC1. In the minimum maintenance section 82, the state of charge SOC is maintained at the minimum state of charge SOC1. Further, for example, as shown in FIG. 6B, the excessive discharging section Td includes a temporal charging section 84 during a falling section 83. In the temporal charging section 84, the state of charge SOC never reaches the maximum state of charge SOC2. The excessive discharging section Td also includes a temporal charging section 85 in a minimum maintenance section 86. In the temporal charging section 85, the state of charge SOC never reaches the maximum state of charge SOC2.

The torque control unit 66 corresponds to a charging/discharging control unit. The torque control unit 66 controls charging and discharging of the battery 20 by controlling the output of the M/G 12. In a case where the vehicle 10 is traveling at a high speed on a highway, the torque control unit 66 uses the route information and the vehicle speed v to execute the temperature rise curbing control. In other cases, the torque control unit 66 executes the normal control. In the normal control, the torque control unit 66 controls the motor command torque Tmref in correspondence with the present travel state to follow a change in the potential energy such that the fuel economy becomes the highest for the motor torque Tm and such that the state of charge SOC reaches the maximum state of charge SOC2 in the shortest time for the regenerative torque Tr.

In the temperature rise curbing control, the torque control unit 66 controls the output of the M/G 12 by setting a first upper limit value for the excessive charging section Tc. The first upper limit value is a fixed charge current value. When the charge current value is maintained at the first upper limit value, the first upper limit value is set such that the state of charge SOC reaches the maximum state of charge SOC2 at the end point of the excessive charging section Tc. Further, the torque control unit 66 controls the output of the M/G 12 by setting a second upper limit value for the excessive discharging section Td. The second upper limit value is a fixed discharge current value. When the discharge current value is maintained at the second upper limit value, the second upper limit value is set such that the state of charge SOC reaches the minimum state of charge SOC1 at the end point of the excessive discharging section Td.

An example of the temperature rise curbing control will now be described with reference to FIGS. 7 and 8. First, the changes in the battery temperature that occur when the output of the M/G 12 is controlled with the normal control will be described with reference to FIG. 7. As described above, in the normal control, the output of the M/G 12 is controlled so as to follow a change in the potential energy of the vehicle 10.

Figure 7:
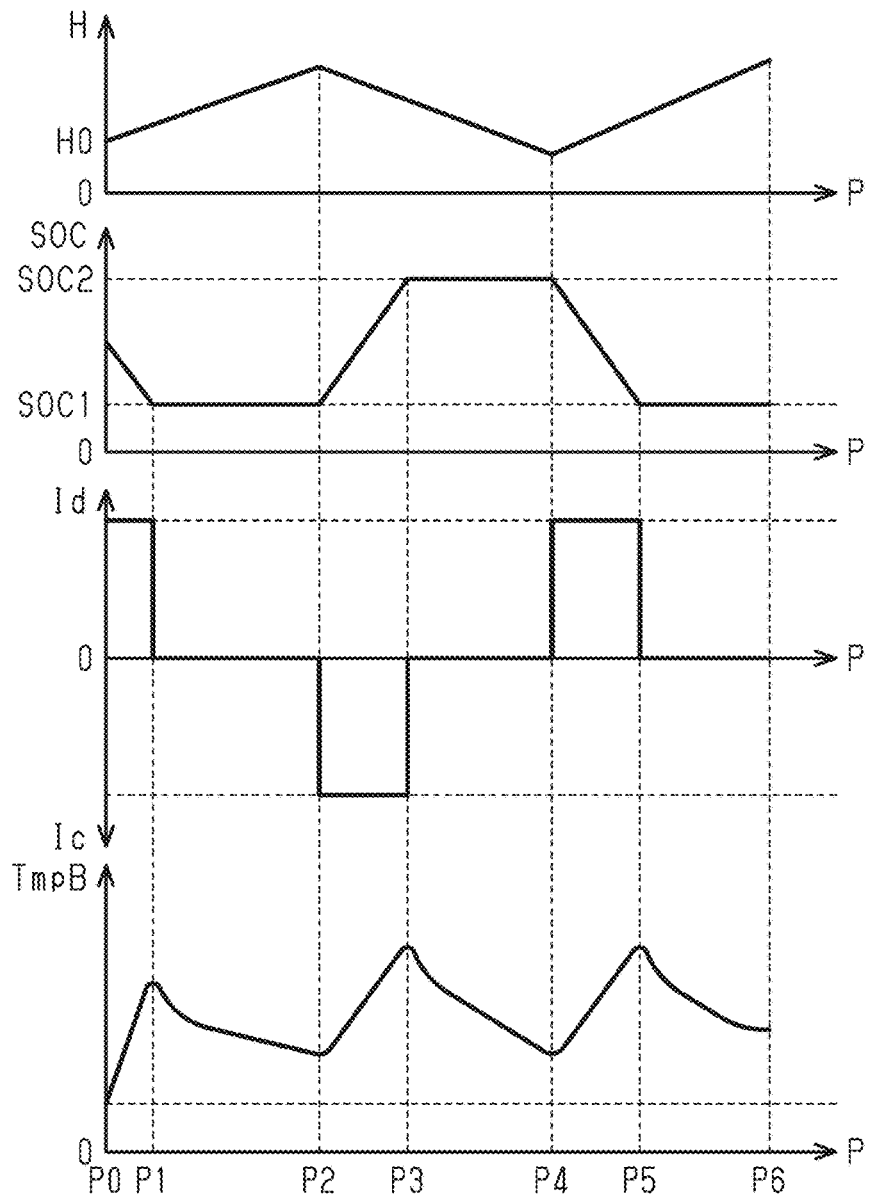
FIG. 7 is a graph showing the relationship between the planned travel route, the estimated change in the state of charge, the charge/discharge current, and the battery temperature in an example of the normal control.

As shown in the first section in FIG. 7, the altitude H changes on the planned travel route (current position P0 to position P6), which is shown in the route information acquired by the acquisition unit 61. In this case, the state of charge SOC changes in correspondence with a change in, for example, the potential energy. As shown in the second section in FIG. 7, the state of charge SOC is maintained at the minimum state of charge SOC1 in the minimum maintenance sections (position P1 to position P2 and position P5 to position P6) and maintained at the maximum state of charge SOC2 in the maximum maintenance section (position P3 to position P4). This is because the motor torque Tm of the M/G 12 is controlled for discharging such that the fuel economy becomes the highest in correspondence with the present travel state. This is also because the regenerative torque Tr of the M/G 12 is controlled for charging such that the state of charge SOC reaches the maximum state of charge SOC2 in the shortest time. In such a normal control, as shown in the third section in FIG. 7, discharging or charging is stopped after a large discharge current or charge current flows into the battery 20 in a short time. In the battery 20, the amount of heat generation resulting from the internal resistance is proportional to the square of current. Thus, as shown in the fourth section in FIG. 7, a battery temperature TmpB exponentially rises and then gradually falls. As a result, the maximum temperature and the average temperature of the battery 20 become high.

Figure 8:
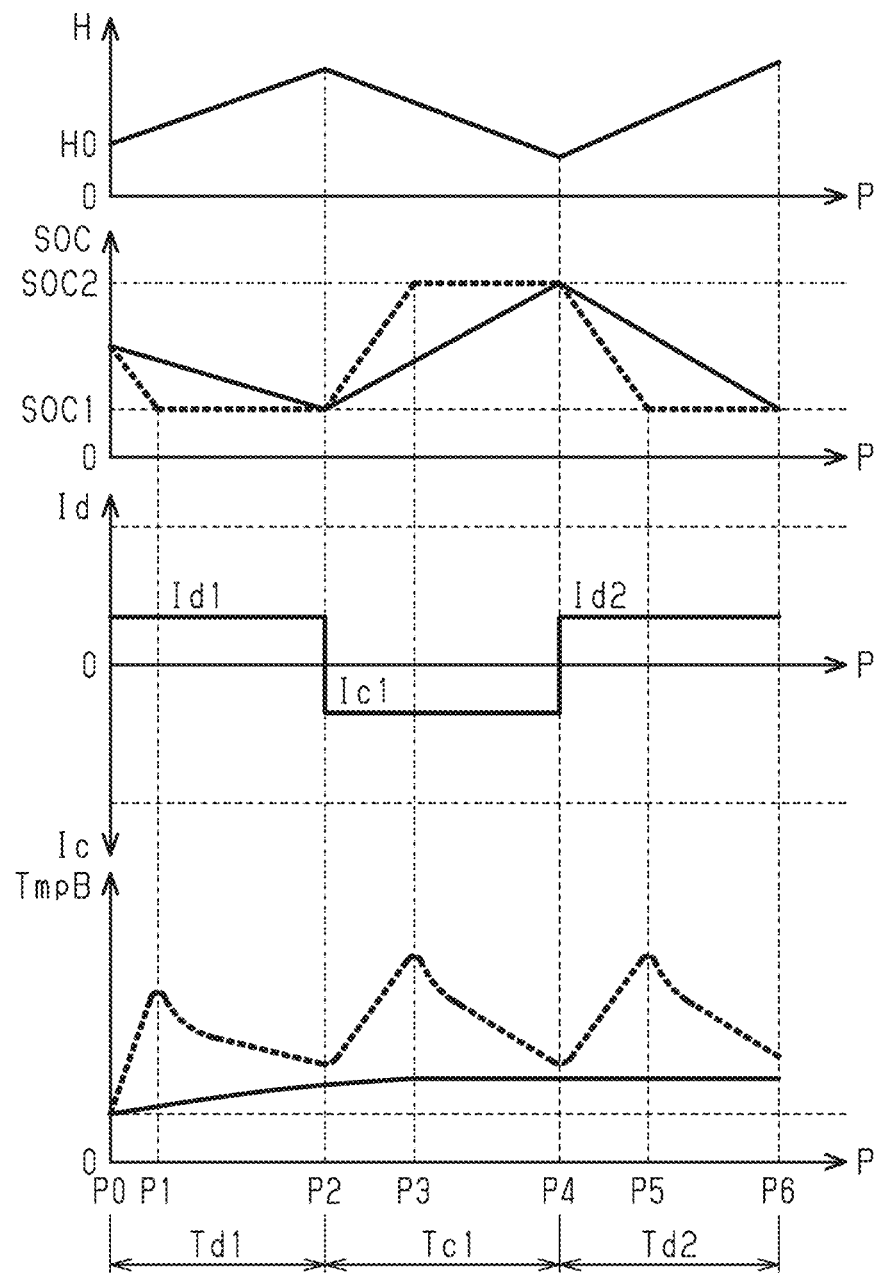
FIG. 8 is a graph showing the relationship between the planned travel route, the estimated change in the state of charge, the charge/discharge current, and the battery temperature in an example of the temperature rise curbing control.

As shown in FIG. 8, when the output of the M/G 12 is controlled with the temperature rise curbing control, for the planned travel route shown in the first section in FIG. 8, the section identification unit 65 sets the section from the current position P0 (start point) to position P2 (end point) as an excessive discharging section Td1, sets the section from position P2 (start point) to position P4 (end point) as an excessive charging section Tc1, and sets the section from position P4 (start point) to position P6 (end point) as an excessive discharging section Td2.

As shown in the second and third sections in FIG. 8, the torque control unit 66 controls the output of the M/G 12 by setting upper limit values (fixed discharge current values Id1 and Id2) for the excessive discharging sections Td1 and Td2. When the discharge current value is maintained at the upper limit value, the state of charge SOC changes at a fixed change rate from the start point (P0, P4) to the end point (P2, P6) and the state of charge SOC becomes the minimum state of charge SOC1 at the end point (P2, P6) in the excessive discharging sections Td1 and Td2. In the excessive discharging sections Td1 and Td2, the discharge amount with which the state of charge SOC reaches the minimum state of charge SOC1 is highly likely to be sufficiently ensured. This allows the state of charge SOC to reach the minimum state of charge SOC1 at the end point (P2, P6) with a high probability even if the upper limit values (fixed discharge current values Id1 and Id2) are set. Further, the torque control unit 66 controls the output of the M/G 12 by setting an upper limit value (fixed charge current value Ic1) in the excessive charging section Tc1. When the charge current value is maintained at the upper limit value, the state of charge SOC changes at a fixed change rate from the start point (P2) to the end point (P4) in the excessive charging section Tc1, and the state of charge SOC becomes the maximum state of charge SOC2 at the end point (P4). In the excessive charging section Tc1, the charge amount with which the state of charge SOC reaches the maximum state of charge SOC2 is highly likely to be sufficiently ensured. This allows the state of charge SOC to reach the maximum state of charge SOC2 at the end point (P4) with a high probability even if the upper limit value (fixed charge current value Ic1) is set.

As shown in the fourth section in FIG. 8, such a configuration reduces the maximum temperature and the average temperature of the battery temperature TmpB while setting the state of charge SOC at each end point of the excessive discharging sections Td1 and Td2 and the excessive charging section Tc1 to be the same as the state of charge SOC in the normal control with a high probability. That is, the configuration ensures the charge/discharge amount of the battery 20 while curbing a rise in the battery temperature TmpB.

Figure 9:
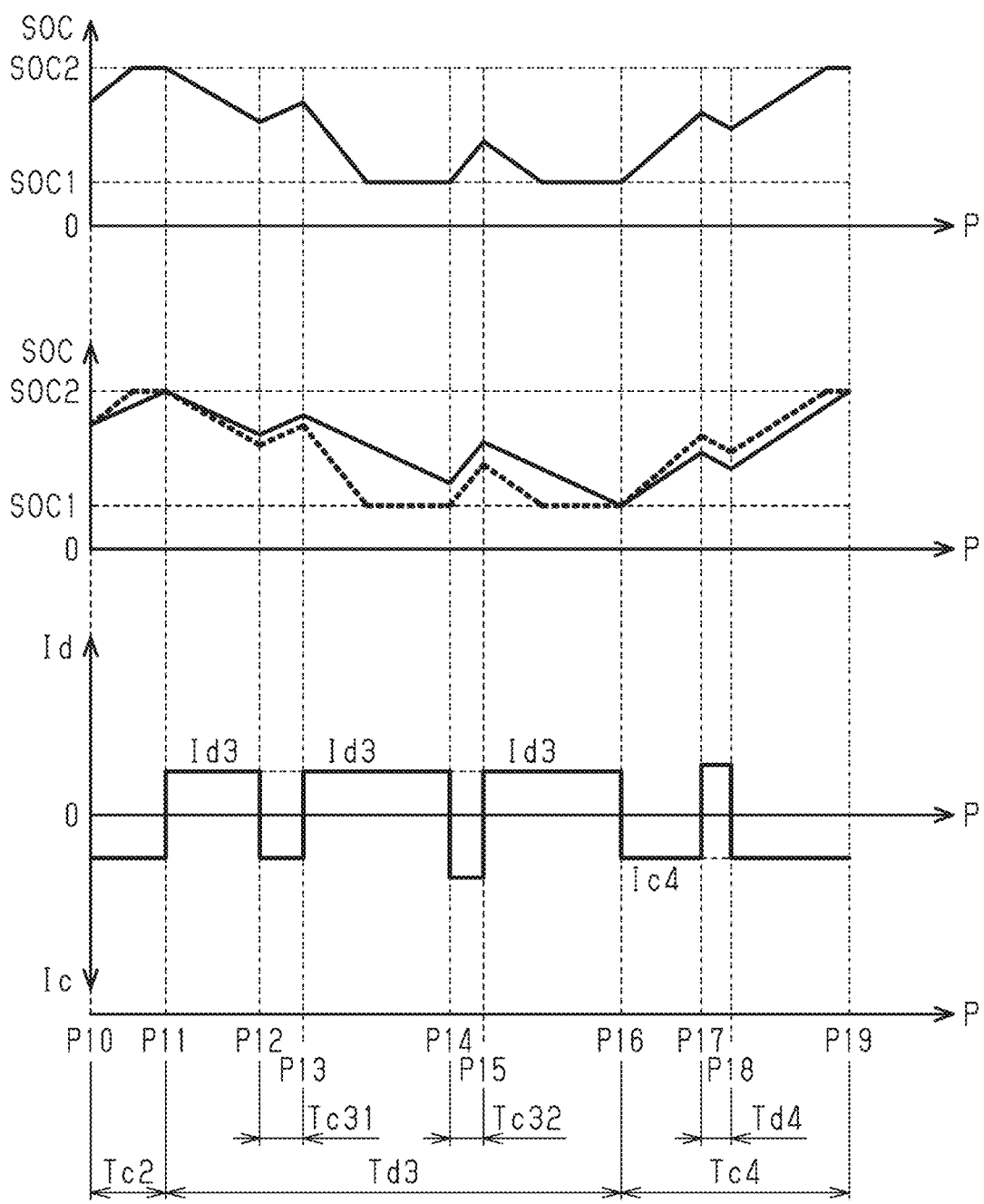
FIG. 9 is a graph showing the relationship between the estimated change in the state of charge and the charge/discharge current in another example of the temperature rise curbing control.

Another example of the temperature rise curbing control will now be described with reference to FIG. 9. In FIG. 9, the first section shows the changes in the state of charge SOC that occur when the normal control is performed, the second section shows the changes in the state of charge SOC that occur when the temperature rise curbing control is performed, and the third section shows the value of current flowing into the battery 20.

As shown in the first section in FIG. 9, an excessive discharging section Td3 in this example includes temporal charging sections Tc31 and Tc32. In the temporal charging sections Tc31 and Tc32, the state of charge SOC never reaches the maximum state of charge SOC2 during the fall in the state of charge SOC from the maximum state of charge SOC2 to the minimum state of charge SOC1. Further, an excessive charging section Tc4 includes a temporal discharging section Td4. In the temporal discharging section Td4, the state of charge SOC never reaches the minimum state of charge SOC1 during the rise in the state of charge SOC from the minimum state of charge SOC1 to the maximum state of charge SOC2.

As shown in the second and third sections in FIG. 9, the torque control unit 66 controls the output of the M/G 12 with the normal control in the temporal charging sections Tc31 and Tc32 in the excessive discharging section Td3 and the temporal discharging section Td4 in the excessive charging section Tc4. Further, the torque control unit 66 controls the output of the M/G 12 by setting an upper limit value (fixed discharge current value Id3) in the excessive discharging section Td3. The upper limit value is set using at least a part of the section lengths in the charging sections Tc31 and Tc32 and using at least a part of a rise in the state of charge SOC. In a case where the discharge current value is maintained at the upper limit value, the state of charge SOC becomes the minimum state of charge SOC1 at the end point (position P16) of the excessive discharging section Td3. The torque control unit 66 controls the output of the M/G 12 by setting an upper limit value (fixed charge current value Ic4) in the excessive charging section Tc4. The upper limit value is set using at least a part of the section length in the discharging section Td4 and using at least a part of a fall in the state of charge SOC. In a case where the charge current value is maintained at the upper limit value, the state of charge SOC becomes the maximum state of charge SOC2 at the end point (position P19) of the excessive charging section Tc4.

Such a configuration reduces the maximum temperature and the average temperature of the battery temperature TmpB while setting the state of charge SOC at each end point of the excessive discharging section Td3 and the excessive charging section Tc4 to be the same as the state of charge SOC in the normal control with a high probability. That is, the configuration ensures the charge/discharge amount of the battery 20 while curbing a rise in the battery temperature TmpB.

The operation and advantages of the present embodiment will now be described.

(1) In the excessive charging section Tc, the charge amount with which the state of charge SOC reaches the maximum state of charge SOC2 is highly likely to be sufficiently ensured. This allows the state of charge SOC to reach the maximum state of charge SOC2 at the end point of the excessive charging section Tc with a high probability even if the charge current value is limited to a fixed charge current value. Further, in the excessive discharging section Td, the discharge amount with which the state of charge SOC reaches the minimum state of charge SOC1 is highly likely to be sufficiently ensured. This allows the state of charge SOC to reach the minimum state of charge SOC1 at the end point of the excessive discharging section Td with a high probability even if the discharge current value is limited to a fixed discharge current value. In the excessive charging section Tc and the excessive discharging section Td, the charge/discharge current is limited to a fixed value to curb a rise in the battery temperature TmpB. That is, the hybrid ECU 31 ensures the charge/discharge amount of the battery 20 while curbing a rise in the battery temperature TmpB.

(2) The excessive charging section Tc includes the temporal discharging section in the rising section, where the state of charge SOC rises from the minimum state of charge SOC1 to the maximum state of charge SOC2. In such a configuration, the excessive charging section Tc is set to a longer section. Thus, the proportion of sections in the planned travel route that limit charge current is increased. This ensures the charge/discharge amount of the battery 20 while effectively curbing a rise in the battery temperature TmpB.

(3) In the excessive charging section Tc, the maximum maintenance section includes the temporal discharging section. In such a configuration, the excessive charging section Tc is set to a still longer section. Thus, the proportion of sections in the planned travel route that limit charge current is further increased. This ensures the charge/discharge amount of the battery 20 while curbing a rise in the battery temperature TmpB more effectively.

(4) The hybrid ECU 31 controls the output of the M/G 12 with the normal control in, for example, the temporal discharging section Td4. This allows discharging to be effectively performed in the temporal discharging section in the excessive charging section Tc. As a result, the fuel economy improves in the excessive charging section Tc.

(5) The excessive discharging section Td includes the temporal charging section in the falling section, where the state of charge SOC falls from the maximum state of charge SOC2 to the minimum state of charge SOC1. This causes the excessive discharging section Td to be set to a longer section. Thus, the proportion of sections in the planned travel route that limit discharge current to a fixed discharge current is increased. This ensures the charge/discharge amount of the battery 20 while effectively curbing a rise in the battery temperature TmpB.

(6) In the excessive discharging section Td, the minimum maintenance section includes the temporal discharging section. In such a configuration, the excessive discharging section Td is set to a still longer section. Thus, the proportion of sections in the planned travel route that limit discharge current to a fixed discharge current is further increased. This ensures the charge/discharge amount of the battery 20 while curbing a rise in the battery temperature TmpB more effectively.

(7) The hybrid ECU 31 controls the output of the M/G 12 with the normal control in, for example, the temporal charging section Tc31. This allows charging to be efficiently performed in the temporal charging section in the excessive discharging section Td.

(8) The temperature rise curbing control is executed during a high-speed traveling on a highway. Such a configuration reduces an error between the changes in the estimated state of charge SOC and the changes in the actual state of charge SOC and thus makes the above-described advantages (1) to (7) more noticeable.

(9) The temperature rise curbing control curbs a rise in the battery temperature TmpB and also reduces the load on the battery 20. This reduces the heat loss. As a result, the discharging efficiency of the battery 20 increases to improve the efficiency of reducing fuel using the M/G 12.

The present embodiment may be modified as follows. The present embodiment and the following modifications can be combined as long as the combined modifications remain technically consistent with each other.

For example, when a minimum maintenance section includes a temporal charging section, a minimum maintenance section prior to the charging section and a minimum maintenance section subsequent to the charging section may be included in excessive discharging sections Td that differ from each other.

The excessive discharging section Td may include only a continuously falling section and a minimum maintenance section that follows the continuously falling section.

For example, when a maximum maintenance section includes a temporal discharging section, a maximum maintenance section prior to the discharging section and a maximum maintenance section subsequent to the charging section may be included in excessive charging sections Tc that differ from each other.

The excessive charging section Tc may include only a continuously rising section and a maximum maintenance section that follows the continuously rising section.

The temperature rise curbing control does not have to be performed when the vehicle 10 is traveling at a high speed on a highway. For example, the temperature rise curbing control may be executed when the vehicle 10 is traveling at a high speed on a main road. That is, the temperature rise curbing control may be executed under a situation where the change in the vehicle speed v is small.

The invention claimed is:

1. A charging/discharging control device configured to control charging and discharging of a battery installed in a hybrid vehicle that includes a motor generator, the motor generator being a power source, the charging/discharging control device comprising:
   a route information acquisition unit configured to acquire a planned travel route, a start point of the planned travel route being a current position;
   a section identification unit configured to estimate a change in a state of charge of the battery using a change in potential energy on the planned travel route and identify an discharging section and an charging section on the planned travel route; and
   a charging/discharging control unit configured to control charging and discharging of the battery by controlling an output of the motor generator, wherein
   the charging section includes a section where the state of charge continues to rise to a maximum state of charge and is then maintained at the maximum state of charge,
   wherein the charging section includes a rising section where the state of charge rises from a minimum state of charge to the maximum state of charge and a maximum maintenance section where the state of charge is maintained at the maximum state of charge after the rising section, the rising section including a temporal discharging section during which the state of charge fails to reach the minimum state of charge,
   the discharging section includes a section where the state of charge continues to fall to a minimum state of charge and is then maintained at the minimum state of charge,
   the charging/discharging control unit is configured to limit a charge current value in the charging section to a fixed first upper limit value, wherein the first upper limit value is set such that the state of charge reaches the maximum state of charge at an end point of the charging section when the charge current value in the charging section is maintained at the first upper limit value, and
   the charging/discharging control unit is further configured to limit a discharge current value in the discharging section to a fixed second upper limit value, wherein the second upper limit value is set such that the state of charge reaches the minimum state of charge at an end point of the discharging section when the discharge current value in the discharging section is maintained at the second upper limit value.

2. The charging/discharging control device according to claim 1, wherein the charging section includes a temporal discharging section in the section where the state of charge is maintained at the maximum state of charge.

3. The charging/discharging control device according to claim 1, wherein the discharging section includes a falling section where the state of charge falls from the maximum state of charge to the minimum state of charge and a minimum maintenance section where the state of charge is maintained at the minimum state of charge after the falling section, the falling section including a temporal charging section.

4. The charging/discharging control device according to claim 1, wherein the discharging section includes a temporal charging section in the section where the state of charge is maintained at the minimum state of charge.

* * * * *